(12) United States Patent
Jang et al.

(10) Patent No.: US 7,847,256 B2
(45) Date of Patent: Dec. 7, 2010

(54) SECURE ENCLOSURE

(75) Inventors: Seok-Joo Jang, Irvine, CA (US);
Terrence G. Ward, Redondo Beach, CA (US); Daniel J. Kaplan, Hawthorne, CA (US); Brooks S. Mann, Torrance, CA (US); Louis Thompson, Torrance, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/130,676

(22) Filed: May 30, 2008

(65) Prior Publication Data

US 2009/0294675 A1 Dec. 3, 2009

(51) Int. Cl.
*G01J 1/42* (2006.01)
(52) U.S. Cl. ...................................... 250/353
(58) Field of Classification Search ................. 250/353; 200/61.02
See application file for complete search history.

(56) References Cited

U.S. PATENT DOCUMENTS

| | | | | |
|---|---|---|---|---|
| 4,234,833 | A * | 11/1980 | Barrett | 318/282 |
| 4,443,700 | A * | 4/1984 | Macedo et al. | 250/227.16 |
| 4,507,654 | A * | 3/1985 | Stolarczyk et al. | 340/545.3 |
| 4,760,229 | A * | 7/1988 | Steers et al. | 219/739 |
| 4,794,377 | A * | 12/1988 | Benages | 340/569 |
| 4,868,543 | A * | 9/1989 | Binkley | 340/569 |
| 6,877,248 | B1 * | 4/2005 | Cross et al. | 34/275 |
| 7,491,926 | B1 * | 2/2009 | Anderson et al. | 250/221 |
| 2003/0025082 | A1 * | 2/2003 | Brewington et al. | 250/341.8 |
| 2006/0049574 | A1 * | 3/2006 | Matsumoto | 271/186 |
| 2008/0060918 | A1 * | 3/2008 | Chiang | 200/61.02 |
| 2009/0050174 | A1 * | 2/2009 | Gheparde | 134/1 |

* cited by examiner

*Primary Examiner*—David P Porta
*Assistant Examiner*—Djura Malevic
(74) *Attorney, Agent, or Firm*—Ingrassia Fisher & Lorenz, P.C.

(57) ABSTRACT

A system is provided for detecting when an enclosure having a body and a removable cover is opened. The system comprises a light source for generating a light beam, a light detector for detecting the light beam, and at least one reflector all mounted inside the enclosure. The reflector reflects the light beam along a predetermined pathway toward the light detector when the removable cover is closed over the body.

20 Claims, 3 Drawing Sheets

US 7,847,256 B2

SECURE ENCLOSURE

TECHNICAL FIELD

The present invention generally relates to housings for automotive electronic components, and more particularly relates to a system for determining when an enclosure for housing a high voltage automotive component such as an inverter, converter, and the like, is opened.

BACKGROUND OF THE INVENTION

In recent years, advances in technology have led to substantial changes in the design of automobiles. One of the changes involves the complexity, as well as the power usage, of various electrical systems within automobiles, particularly alternative fuel vehicles.

During this time, the requirement for electrical power generation in automotive applications has risen dramatically. This trend had been in place for decades but has accelerated in the last few years largely due to the advent of hybrid, electric, and fuel cell based vehicles. Such vehicles often use electrochemical power sources, such as batteries, ultracapacitors, and fuel cells, to power the electric motors that drive the wheels, sometimes in addition to another power source, such as an internal combustion engine. As the nature of automotive energy sources has rapidly moved in the direction of electrical power, the use of electronic systems including those that operate with high voltage, has inevitably increased as well.

To manage these high voltage requirements, modern alternative fuel cars now routinely carry several varieties of electrical components designed to deliver high levels of power at high voltages. These include power converters such as direct current-to-direct current (DC/DC) converters, that are typically used to control and transfer the power from input voltage sources such as batteries and/or fuel cells. Due to the fact that alternative fuel automobiles typically include only direct current (DC) power supplies, direct current-to-alternating current (DC/AC) inverters (or power inverters) are also provided to convert the DC power to alternating current (AC) power, which is generally required by the primary drive motors.

Many electronic systems and especially those using components that carry high power and/or voltage typically are accompanied by a robust and reliable security system to keep them operable under a myriad of driving conditions. In the past, security for high voltage systems was typically provided for by a durable surrounding housing coupled with an interlock system having mechanical switches designed to detect and respond to any breach to the inner compartment. These systems were reliable but complex; often involving a series of wiring bundles needed to interconnect each of the remote sensors to a central processing unit.

Accordingly, it is desirable to provide a system for providing security for automotive electronic components that is both reliable and simple in design. Furthermore, other desirable features and characteristics of the present invention will become apparent from the subsequent detailed description and the appended claims, taken in conjunction with the accompanying drawings and the foregoing technical field and background.

SUMMARY OF THE INVENTION

A system is provided for detecting when an enclosure having a body and at least one removable cover is opened. The system comprises a light source for generating a light beam, a light detector for detecting the light beam, and at least one reflector all mounted inside the enclosure. The reflector reflects the light beam along a predetermined pathway toward the light detector when the removable cover is closed over the body.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

Figure 1:
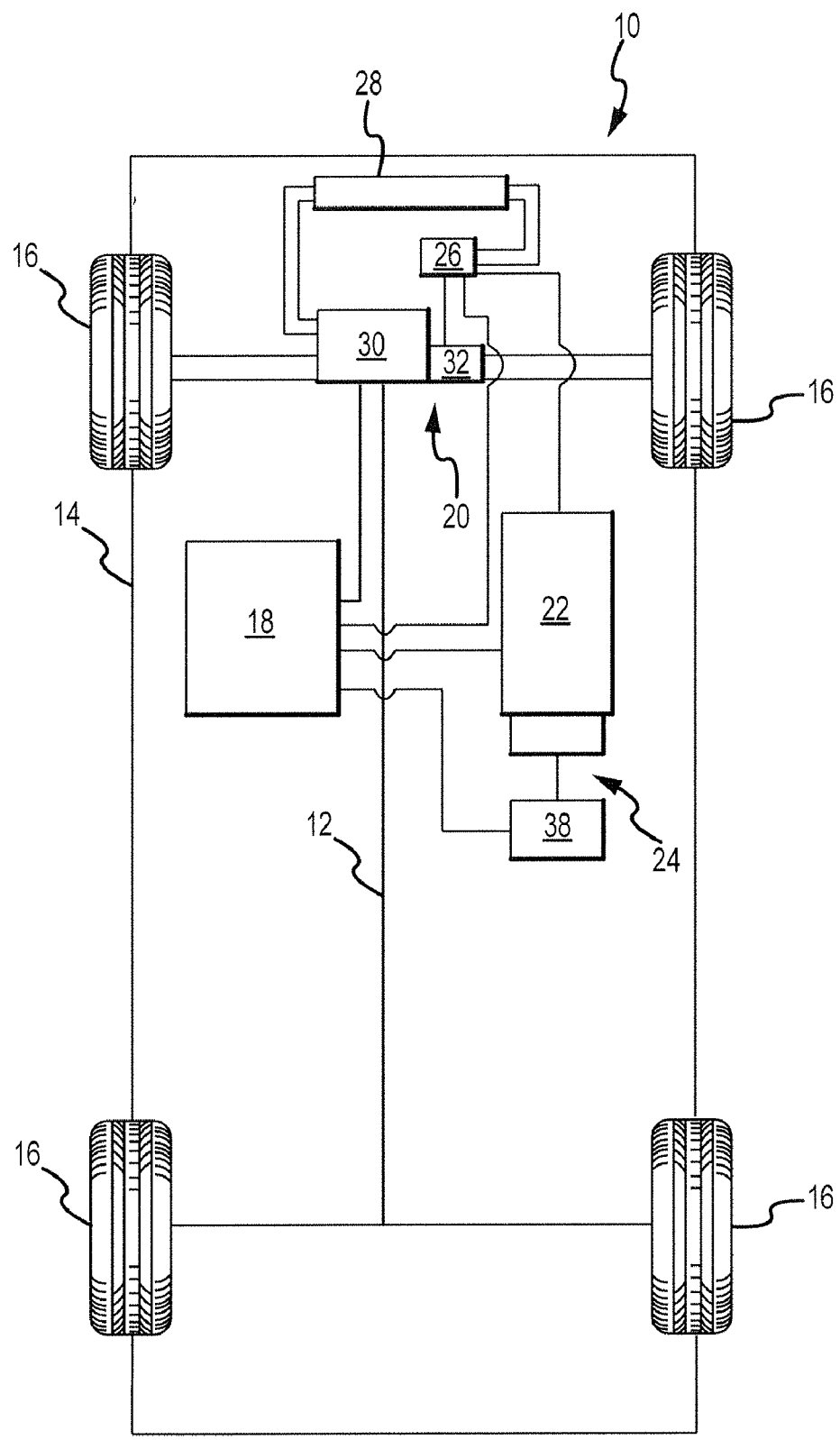
FIG. 1 is a schematic view of an exemplary automobile illustrating the manner in which an embodiment is integrated with various sub-components of an automobile.

FIG. 1 illustrates a vehicle, such as an automobile, 10 according to one embodiment of the present invention. The automobile 10 includes a chassis 12, a body 14, four wheels 16, and an electronic control system (or electronic control unit (ECU)) 18. The body 14 is arranged on the chassis 12 and substantially encloses the other components of the automobile 10. The body 14 and the chassis 12 may jointly form a frame. The wheels 16 are each rotationally coupled to the chassis 12 near a respective corner of the body 14.

The automobile 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The automobile 10 may also incorporate any one of, or combination of, a number of different types of engines (or actuators), such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, or a fuel cell, a combustion/electric motor hybrid engine, and an electric motor.

In the exemplary embodiment illustrated in FIG. 1, the automobile 10 is a hybrid vehicle, and further includes an actuator assembly (or powertrain) 20, a battery 22, a battery state of charge (SOC) system 24, a power inverter 26, and a radiator 28. The actuator assembly 20 includes an internal combustion engine 30 and an electric motor/generator (or motor) system (or assembly) 32. The battery 22 is electrically connected to the power inverter 26 and, in one embodiment, is a lithium ion (Li-ion) battery including a plurality of cells, as is commonly understood.

Many electronic components within a hybrid vehicle, including high voltage components, are housed within durable protective enclosures. Examples of such components are illustrated in FIG. 1 and include a power inverter 26, an electronic control unit 18, and a state of charge (SOC) module 38. These enclosures provide electronic components with protection from all types of intrusions which may adversely affect their performance or reliability. An enclosure used for housing high voltage components typically has the shape of a right rectangular prism, and is composed of six planar side panels.

To provide access to the inside of the compartment and its contents, an enclosure is typically designed having a body comprised of connected sides, and at least one removable side (or cover) made to close the body and complete the enclosure. The enclosure may be fabricated with any one of its six sides removable, and the choice is generally made on the basis of convenience in providing access to the compartment. However, an enclosure is not limited to having only one removable cover, and often will be comprised of a plurality of removable covers as dictated by design constraints as well as convenience. The final choice may also depend upon the enclosure's contents, and in the case of high voltage components, will also depend upon safety considerations. It should be understood that while one general compartment shape has been herein described, this invention is neither specific to, nor limited to, a particular geometry.

Figure 2:
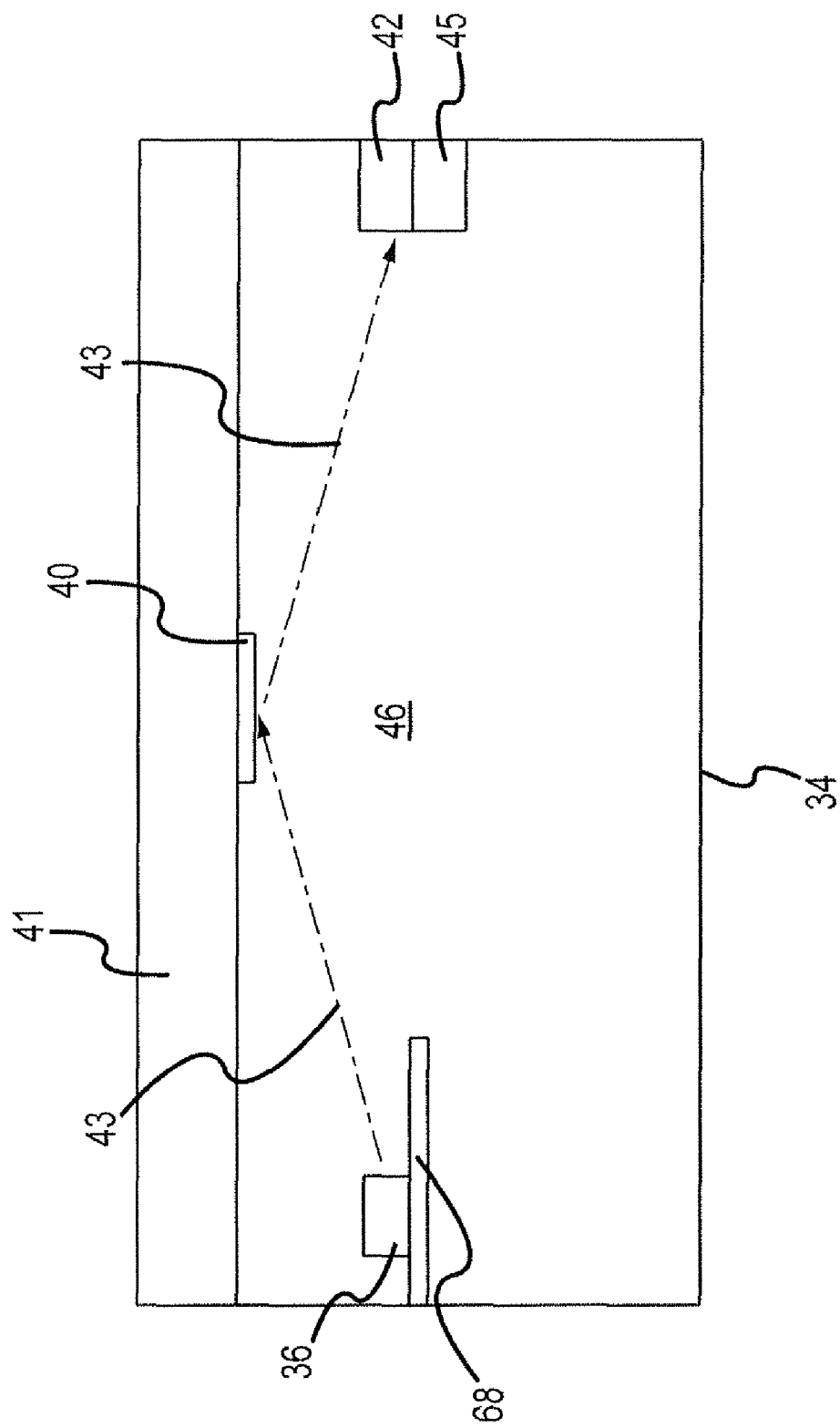
FIG. 2 is a schematic drawing illustrating an enclosure in accordance with a first embodiment of the present invention.

FIG. 2 is a schematic drawing illustrating an enclosure for housing an electronic component, such as a vehicular high voltage component, in accordance with a first embodiment of the present invention. Referring to FIG. 2, an optical security system 46 includes an enclosure 34 having a removable cover 41. A light source 36 and a light detector 42 are both mounted inside of enclosure 34. A reflector 40 is mounted on the inside surface of the removable cover 41. Light source 36 emits a light beam 43 that propagates along a predetermined pathway that includes reflector 40, toward detector 42. Light beam 43 strikes reflector 40 and is reflected toward detector 42. The pathway terminates at detector 42 where light beam 43 is detected.

When a system element such as a source, detector, or reflector is herein said to be mounted "inside the enclosure," it is understood that the element may be attached to any inner surface of the enclosure including a removable cover, or to any other convenient mounting surface within the body of the enclosure such as to a circuit board. Conversely, when an element is described as being mounted "inside the body," it means that that element is contained within the bounds of the body and is attached to one of the body's connected sides or to a convenient surface within the body, but not to a removable cover.

The predetermined pathway of light is defined as the route taken by light beam 43 in advancing from source 36 to detector 42, and is generally designed to include all points in the enclosure 34 to be monitored. In one embodiment illustrated in FIG. 2, the predetermined pathway is configured in two dimensions comprising two segments forming a plane; the first segment between light source 36 and reflector 40, and a second segment between reflector 40 and detector 42. A light pathway may also be designed having additional segments and may span three dimensions wherein a plurality of reflectors is used to monitor a multitude of non-coplanar points.

Referring to FIG. 2, optical system 46 senses if removable cover 41 is open or closed and signals a controller 45 coupled to detector 42 to take appropriate action. If removable cover 41 is open, detector 42 may send a signal to the controller 45 to deactivate electronic components housed in enclosure 34. If removable cover 41 is closed, detector 42 may signal the controller 45 to maintain activation of these electronic components. Thus, system 46 determines the status of removable cover 41 by first transmitting light beam 43 from source 36 along a predetermined pathway that includes reflector 40 to detector 42. Secondly, reflector 40 is configured to relay light beam 43 toward detector 42 only when removable cover 41, to which reflector 40 is mounted, is closed. The configuration that results in a completed light pathway from the light source 36 to the light detector 42 will hereinafter be referred to as the "home" configuration. In general, a system element (source, detector, or reflector) is "home" when it is configured to receive the light beam from the preceding element (or emit light in the case of a source), and advance it along the predetermined pathway toward the following element. Therefore, light beam 43 arrives at light detector 42 and electronic components housed in enclosure 34 remain active only when removable cover 41 is closed because that brings reflector 40 to its home position.

Those skilled in the art will appreciate that other combinations exist wherein a single source, a single detector, and a single reflector can be configured to monitor an enclosure. In one embodiment, the light source 36 is attached to the inside of the removable cover 41, while detector 42 and reflector 40 are fixed inside enclosure 34. Light source 36 is configured in a home position when removable cover 41 is closed. In another embodiment, light source 36 and light detector 42 are attached to the inside face of removable cover 41, and reflector 40 is fixed inside enclosure 34. Light source 36 and light detector 42 are brought to their home configurations when removable cover 41 is closed. From these preceding examples, it is apparent that other embodiments are possible wherein these three elements may comprise a security system for an enclosure. A factor common to each is that the light source, the light detector, and the reflector are disposed in their home configurations causing light beam 43 to reach light detector 42 only when removable cover 41 is fully closed.

The term "light beam" as used herein applies to the specific emission of light that originates from the light source. Those having skill in the art will appreciate that light emitted from a source may be modified by many factors including but not limited to effects from diffraction, refraction, reflection or absorption by air molecules or particulates, imperfections in reflective surfaces, and the like. Further, additional optical elements such as beam splitters may be introduced into the system to divide the source beam into two or more distinct beams. Therefore, the term "light beam" encompasses not only the initial emission of light from the source, but also any division or residual of light attributable to the source that is used by the optical system.

Many types of light sources and detectors are commonly used for optical security systems. It is advantageous however to use source and detector elements that have specific attributes especially suited to vehicular use. In particular, diodes may be used as both sources and detectors because they have many characteristics including durability and compact size needed for automotive applications. Further, diode emissions can be on/off modulated allowing the detector to be configured to process only light originating from the source having a specific modulation frequency. Referring to FIG. 2, in one embodiment the light source 36 is a light emitting diode (LED) which emits an infrared light beam modulated at a specific frequency. The detector 42 is a photodiode tuned to amplify modulated light at the source emission frequency. Both the LED light source 36 and the photodiode detector 42 may be integrated onto a printed circuit board 68 with supporting electronics to provide power and modulation. In another embodiment, detector 42 is a silicon PIN-type photodiode having a response substantially matched to the output wavelength of light source 36. While certain types of LED sources have been herein described, it is understood that other types, including but not limited to laser diodes, may also be used.

In general, an optical system having multiple reflectors offers some important advantages over systems using a single reflector. A plurality of reflectors can be configured to define a predetermined pathway routing the light beam in three dimensions to virtually any desired monitoring point within an enclosure. In the embodiment illustrated in FIG. 3, six reflectors 40, 48, 56, 60, 70, and 72 are specifically configured to advance light beam 43 along a predetermined pathway circumscribing the inner periphery of enclosure 34 to monitor three removable covers 37, 39, and 41. Such a configuration requires only a single source 36 and a single detector 42, yet provides continuous real-time monitoring of a plurality of locations and removable covers.

Figure 3:
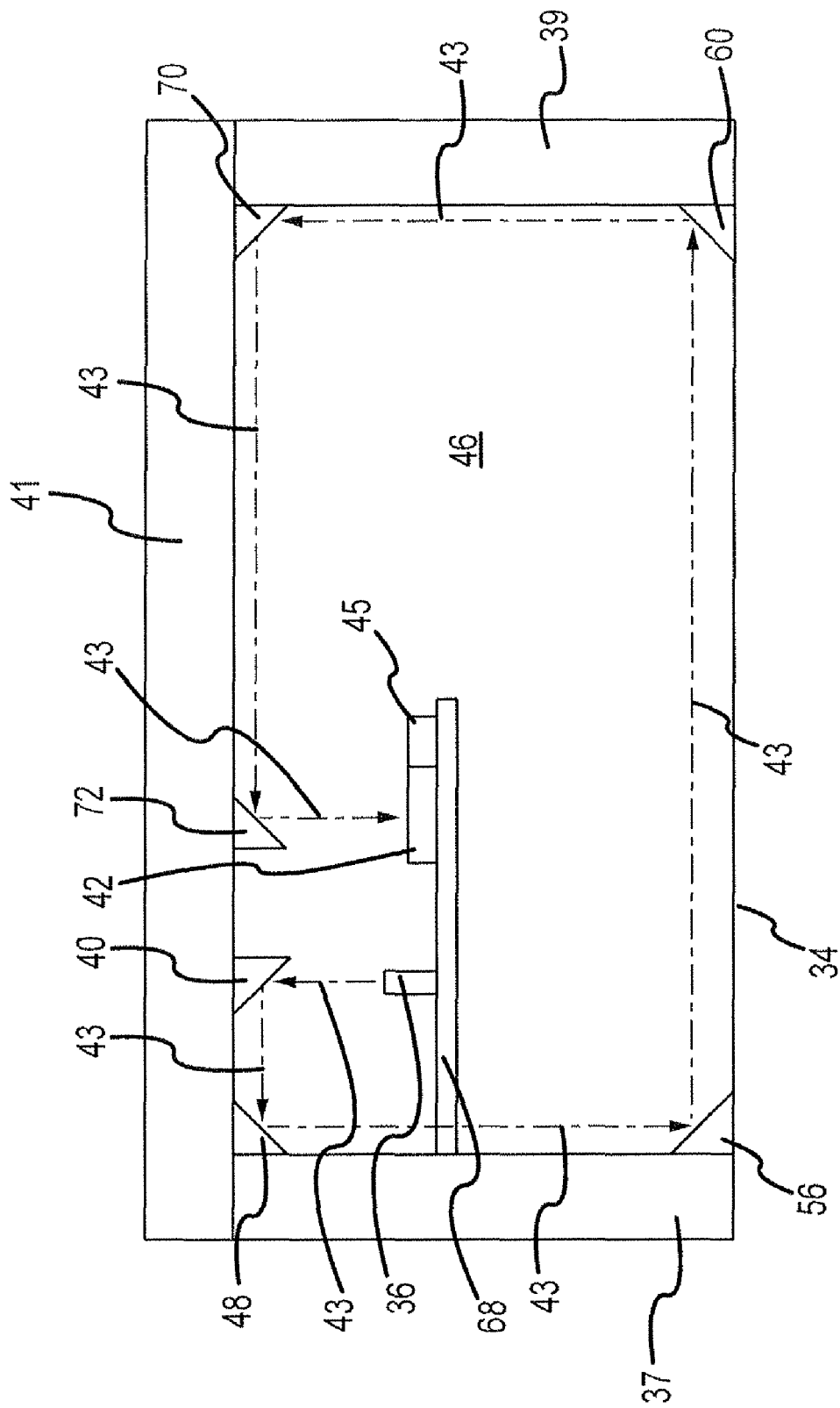
FIG. 3 is a schematic drawing illustrating an enclosure in accordance with a second embodiment of the present invention.

Referring to FIG. 3, optical system 46 comprises light source 36 and light detector 42 attached to printed circuit board 68 mounted inside enclosure 34. Each of three removable covers 37, 39, and 41 has two distinct reflectors attached to its inside surface. Reflectors 40 and 72 are attached to the top removable cover 41, reflectors 48 and 56 are attached to a first removable sidecover 37, and reflectors 60 and 70 are attached to a second removable sidecover 39. Light source 36 emits a light beam 43 that is propagated by the reflectors in the above sequence toward detector 42. In this embodiment, each reflector assumes its home configuration when the removable cover to which it is attached is closed over enclosure 34. In this manner, each reflector represents a monitoring point so as to obtain the status (open or closed) of removable covers 37, 39, and 41. When any of these covers is opened, the attached reflectors are moved away from their home configuration, and light beam 43 does not reach detector 42. When this happens, the controller 45 is signaled to deactivate the electronic components housed in enclosure 34.

In the embodiment illustrated in FIG. 3, the progression of steps taken in propagating light beam 43 from light source 36 to light detector 42 in the case wherein all removable covers are closed is as follows. Light beam 43 is generated by light source 36 and strikes first reflector 40. It is then reflected from first reflector 40 toward a second reflector 48. Light beam 43 strikes second reflector 48 and is reflected toward a third reflector 56. In a similar manner, light beam 43 is propagated sequentially along the predetermined light path by reflectors 56, 60, 70, and 72. Finally, light beam 43 is reflected from reflector 72 toward detector 42. When light detector 42 detects light beam 43, light detector 42 signals the controller 45 to maintain activation of components housed in enclosure 34.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A system for detecting when an enclosure is opened, the enclosure having a body and a removable cover, the system comprising:
   a vehicular high voltage component housed in the body of the enclosure;
   a light source for generating a light beam, the light source mounted inside the enclosure;
   a light detector for detecting the light beam, the light detector mounted inside the enclosure;
   at least one reflector mounted inside the enclosure, to reflect the light beam along a predetermined pathway toward the light detector for indicating that the removable cover is closed over the body; and
   a controller coupled to the light detector and the vehicular high voltage component, wherein the controller is configured to deactivate the vehicular high voltage component when the light beam does not reach the light detector.

2. A system according to claim 1, wherein the light source is configured to emit modulated light.

3. A system according to claim 1, wherein the light source comprises a light emitting diode.

4. A system according to claim 3, wherein the light source emits infrared light.

5. A system according to claim 1, wherein the light detector is a photodiode.

6. A system according to claim 2, wherein the light detector is configured to detect modulated light.

7. A system for securing a vehicular high voltage component, the system comprising:
   an enclosure for containing the vehicular high voltage component, the enclosure having a body and at least one removable cover, the at least one removable cover closing the body and completing the enclosure to provide protection from intrusions;
   a light source for generating a light beam, the light source mounted on a printed circuit board inside the body of the enclosure;
   a light detector for detecting the light beam, the light detector mounted on the printed circuit board inside the enclosure;
   a plurality of reflectors mounted inside the enclosure for sequentially propagating the light beam along a predetermined pathway from the light source to the light detector; and
   a controller mounted on the printed circuit board inside the enclosure, the controller being coupled to the light detector for controlling activation of the vehicular high voltage component.

8. A system according to claim 7, wherein the light detector causes the controller to deactivate the electronic component when the light beam from the light source does not reach the light detector.

9. A system according to claim 7, wherein at least one of the plurality of reflectors is mounted on each removable cover.

10. A system according to claim 7, wherein the light source, the light detector, and the plurality of reflectors are each brought to a home position when the enclosure is closed by the removable covers, and wherein the light detector signals the controller to deactivate the electronic component when any one of the light source, the light detector, and the plurality of reflectors is not in its home position.

11. A system for detecting when an enclosure is opened, the enclosure having a body and a plurality of removable covers, the system comprising:
   a light source for generating a light beam, the light source mounted inside the enclosure;
   a light detector for detecting the light beam, the light detector mounted inside the enclosure;
   a plurality of reflectors mounted inside the enclosure for sequentially propagating the light beam along a predetermined pathway from the light source to the light detector, the predetermined pathway circumscribing an inner periphery of the enclosure to monitor the plurality of removable covers; and
   a controller coupled to the light detector, wherein the light detector signals the controller to deactivate an electronic component housed in the enclosure when the light beam does not reach the light detector.

12. A system according to claim 11, wherein each removable cover has at least one of the light source, the light detector, and the plurality of reflectors mounted on it.

13. A system according to claim 11, wherein at least one of the light source, the light detector, and one of the plurality of reflectors is mounted inside of the body.

14. A system according to claim 11, wherein the light detector is configured to detect only light emitted by the light source.

15. A system according to claim 11, wherein the light source is an infrared light emitting LED.

16. A system according to claim 11, wherein the light source, the light detector and the plurality of reflectors are configured to form a two-dimensional, planar, predetermined pathway.

17. A system according to claim 11, wherein the light source, the light detector, and the plurality of reflectors are configured to form a three-dimensional predetermined pathway.

18. The system of claim 1, the removable cover being configured to close the body, wherein the vehicular high voltage component is enclosed by the removable cover when the removable cover closes the body.

19. The system of claim 1, wherein the vehicular high voltage component is selected from the group consisting of a power inverter, a state of charge module, and an electronic control unit.

20. The system of claim 7, wherein the controller and the light detector are adjacent.

* * * * *